3,326,916
N-PHENYLPIPERAZINE COMPOUNDS
Andrew Malcolm Creighton, London, William Robert Wragg, Woodford Green, and Donald Robert Maxwell, Shenfield, England, assignors to May & Baker Limited, Essex, England, a British company
No Drawing. Filed Apr. 7, 1965, Ser. No. 446,417
Claims priority, application Great Britain, Apr. 14, 1964, 15,439/64
4 Claims. (Cl. 260—268)

This invention relates to new piperazine derivatives of therapeutic value, to processes for their preparation and to pharmaceutical compositions containing them.

According to the present invention there are provided the new, therapeutically useful N-phenylpiperazine derivatives of the general formula:

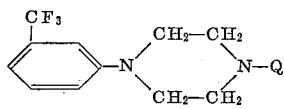

wherein Q represents a group —$(CH_2)_mCOOR$ (wherein $m$ represents zero or an integer from 1 to 6 inclusive and R represents an alkyl group containing from 1 to 6 carbon atoms) or a group —$CH_2$—$(CH_2)_mR_1$ (wherein $R_1$ represents a cyano or carboxyl group and $m$ is as hereinbefore defined) and non-toxic acid addition salts thereof, and, when $R_1$ represents a carboxyl group, non-toxic salts with bases such as alkali metal hydroxides and amines, for ample N-methylglucamine and mono-, di- and tri-ethanolamine.

The aforesaid compounds and non-toxic salts thereof possess pharmacological and psychotropic properties indicative of utility in the treatment of behavioural disorders, anxiety states and related psychiatric conditions. Preferred compounds are those of Formula I in which Q represents a —$(CH_2)_mCOOR$ grouping and especially those such compounds wherein $m$ represents 2 and R represents a methyl or ethyl group, and those in which Q represents a group —$CH(CH_2)_mCN$, and more especially 1 - (2 - cyanoethyl) - 4-(m-trifluoromethylphenyl)piperazine, and non-toxic acid addition salts thereof. Of particular importance are 1-(2-methoxycarbonylethyl)-4-(m-trifluoromethylphenyl)piperazine and its non-toxic acid addition salts.

According to a feature of this invention, the compounds of Formula I are prepared by the reaction of m-trifluoromethylphenylpiperazine of the formula:

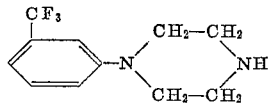

with a compound of the formula Hal—Q, wherein Hal represents a halogen atom such as chlorine, bromine or iodine, and Q is as hereinbefore defined. The reaction is preferably effected by heating the reactants in an inert organic solvent, such as a benzene hydrocarbon, e.g. benzene, or a halogenated hydrocarbon, e.g. chloroform, in the presence of an acid-binding agent, e.g. an alkali metal or derivative thereof, such as an alkali metal carbonate, hydroxide, alkoxide, amide or hydride, or a tertiary base such as triethylamine.

According to a further feature of the invention, the compounds of Formula I are prepared by the reaction of an aniline derivative of the formula:

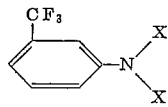

with a compound of the general formula:

wherein the symbols X and Y are such that when X represents a hydrogen atom Y represents a —$CH_2CH_2Hal$ grouping, and when X represents a —$CH_2CH_2Hal$ grouping Y represents a hydrogen atom, and Q and Hal are as hereinbefore defined. The reaction may be effected in the presence or absence of an acid-binding agent, but is preferably effected by heating the reactants in an inert organic solvent, such as an alcohol (e.g. ethanol), a ketone (e.g. acetone), a benzene hydrocarbon (e.g. benzene) or a halogenated hydrocarbon (e.g. chloroform), and in the presence of an acid-binding agent, e.g. an alkali metal or derivative thereof such as an alkali metal carbonate, hydroxide, alkoxide, amide or hydride, or a tertiary base such as triethylamine.

According to a still further feature of the invention, the compounds of Formula I in which Q represents a

—$CH_2CH_2T$ group (wherein T represents a cyano or carboxy group or a grouping —COOR, R being as hereinbefore defined) are prepared by the reaction of an acrylic compound of the formula $CH_2$=$CH$—$T_1$ [wherein $T_1$ represents a cyano or carboxy group or an aldehyde (—CHO) or alcohol grouping (—$CH_2OH$) or a grouping —COOR, R being as hereinbefore defined] with m-trifluoromethylphenylpiperazine, and, when $T_1$ represents an aldehyde or alcohol grouping, oxidising by known methods that grouping in the intermediate product obtained to a compound of Formula I wherein Q represents the group

—$CH_2CH_2COOH$

The reaction with the acrylic compound may be effected with or without an inert organic solvent, such as an alcohol (e.g. ethanol), a ketone (e.g. acetone), a benzene hydrocarbon (e.g. benzene), or a halogenated hydrocarbon (e.g. chloroform), and in the presence or absence of a condensing agent, but is preferably effected with an inert solvent such as those set out above and in the presence of a suitable condensing agent such as benzyltrimethylammonium hydroxide.

According to another feature of the invention, the compounds of general Formula I in which Q represents a —$CH_2$—$(CH_2)_mCN$ group are prepared by the reaction of a corresponding halide of the formula:

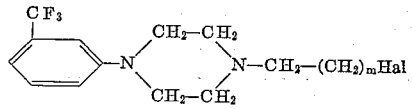

(wherein Hal is as hereinbefore defined) with a metallic-cyanide such as cuprous, potassium or sodium cyanide or sodium or potassium cupro- or nickelo-cyanide.

The compounds of Formula V may themselves be prepared from the corresponding alkanols of the formula:

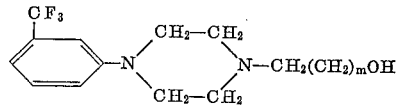

(wherein $m$ is as hereinbefore defined) by reaction with a suitable halogenating agent such as thionyl chloride or bromide or phosphorus trichloride or tribromide. The alkanols of Formula VI may be conveniently prepared by reaction of m-trifluoromethylphenylpiperazine with a hydroxyalkyl halide of the formula Hal—$CH_2(CH_2)_mOH$ wherein $m$ and Hal are as hereinbefore defined.

As indicated above the symbol Q may represent an alkoxycarbonyl, alkoxycarbonylalkyl, cyanoalkyl or carboxyalkyl group. It is within the scope of the present invention to prepare a compound having a desired substituent by first preparing a compound which has a substituent different from that desired and thereafter converting this substituent to the desired substituent. Thus, the compounds of Formula I in which Q is a carboxyalkyl group can be prepared from the corresponding compounds of Formula I, in which Q is a cyanoalkyl group, by known methods for the hydrolysis of nitriles, for example by reaction with an aqueous alkali metal hydroxide, such as sodium hydroxide. Such carboxyalkyl compounds of Formula I can be converted into alkoxycarbonylalkyl compounds of Formula I according to known methods of esterification, for example, by reaction with the corresponding alcohol in the presence of a mineral acid such as hydrochloric acid. The compounds of Formula I, in which Q is an alkoxycarbonylalkyl group, may be converted into compounds of Formula I, in which Q is carboxyalkyl group, according to known methods for the hydrolysis of esters, for example, by heating with aqueous sodium hydroxide solution. The expression "known methods" used in the specification and accompanying claims means methods heretofore used or described in the chemical literature.

When the compounds of general Formula I are used for therapeutic purposes in the form of acid addition salts, it should be understood that only those such salts should in practice be employed as contain anions that are relatively innocuous to the animal organism when used in therapeutic doses so that the beneficial physiological properties inherent in the parent compounds are not vitiated by side-effects ascribable to those anions; in other words, only non-toxic salts are contemplated. Suitable acid addition salts include hydrohalides (for example, hydrochlorides), phosphates, nitrates, sulphates, maleates, fumarates, citrates, tartrates, methanesulphonates, isethionates and ethane disulphonates. Such salts may be made bases of Formula I by the methods heretofore used in the art for making acid addition salts. For example, the acid addition salts may be made by mixing the base with an equivalent quantity of a non-toxic acid in a solvent and isolating the resultant salt by filtration after, if necessary, evaporation of part or all of the solvent. They may be purified by crystallisation or by any other method commonly used in the art. Non-toxic salts of the compounds of general Formula I, wherein Q represents a carboxyalkyl group, with bases such as alkali metal hydroxides and amines may be prepared in a similar manner to acid addition salts by mixing the acid of Formula I with an equivalent quantity of the base in a solvent and isolating the resultant salt by filtration after, if necessary, evaporation of part or all of the solvent.

The following examples illustrate the invention.

*Example I* m-Trifluoromethylphenylpiperazine (11.0 g.) was treated at ambient temperature with stirring with methyl acrylate (4.7 ml.; 4.56 g.) An exothermic reaction took place and the temperature of the reaction mixture rose to 48° C. during 5 minutes. The temperature then began to fall and at 38° C. one drop of a 40% w./v. ethanolic solution of benzyltrimethylammonium hydroxide was added but no further temperature change took place. The reaction mixture was allowed to stand at ambient temperature for 40 hours and then heated at 60° C. for 1 hour. The resulting oil was cooled and dissolved in isopropanol (100 ml.). Concentrated hydrochloric acid (4.1 ml.) was added to this solution to give a white crystalline solid which dissolved readily on warming. The solvent was removed by distillation under reduced pressure and the residue dried by azeotropic distillation with benzene. The white solid residue was crystallised from ispropanol (50 ml.), using charcoal and hot filtration, to give a white solid which was collected by filtration and dried in vacuo to yield 1-(2-methoxycarbonylethyl)-4-(m-trifluoromethylphenyl)piperazine hydrochloride (15.0 g.; 89%), M.P. 176–177° C.

The m-trifluoromethylphenylpiperazine used as starting material was prepared as follows:

m-Trifluoromethylaniline (200 g.), diethanolamine (132 g.) and 48/50% w./w. hydrobromic acid (285 ml.) were heated together up to 180° C. during two hours, and the mixture then maintained at 180–200° C. for 3 hours. The solid product was allowed to cool and was then recrystallised, first from water and then from methanol to give m-trifluoromethylphenylpiperazine hydrobromide (215 g.; 56%), M.P. 250–253° C.

m-Trifluoromethylphenylpiperazine hydrobromide (155 g.) was suspended in water (600 ml.), cooled in ice and treated with excess 50% w./v. aqueous sodium hydroxide solution (60 ml.). The resulting mixture was shaken with diethyl ether (100 ml.) and the two layers separated. The aqueous layer was re-extracted with diethyl ether (2× 250 ml.) and the ethereal extracts (1500 ml.) combined, washed with water (2× 250 ml.) and dried over anhydrous magnesium sulphate. The magnesium sulphate was removed by filtration and the filtrate evaporated to dryness to give m-trifluoromethylphenylpiperazine as a straw-coloured oil (115 g.; 100% recovery).

*Example II* m-Trifluoromethylphenylpiperazine hydrobromide (prepared as described in Example I) (20 g.) in water (100 ml.) was treated with 2 N aqueous sodium hydroxide solution (70 ml.) and methyl chloroformate (6.08 g.) in chloroform (200 ml.) over 5 minutes at ambient temperature. The resulting suspension was stirred for 20 minutes at ambient temperature, the two layers were separated and the aqueous layer re-extracted with chloroform (2× 100 ml. portions). The chloroform extracts were combined, washed with water (50 ml.), dried over anhydrous magnesium sulphate, filtered and the solvent removed under reduced pressure. The residue, which solidified, was recrystallised twice from ethyl acetate and cyclohexane to give 1-methoxycarbonyl-4-(m-trifluoromethylphenyl)piperazine (4.6 g.) as off-white prisms, M.P. 58–60° C.

Treatment of this base with excess methanesulphonic acid and recrystallisation of the salt from ethyl acetate and diisopropyl ether gave 1-methoxycarbonyl-4-(m-trifluoromethylphenyl)piperazine methanesulphonate. M.P. 124–126° C.

*Example III* m-Trifluoromethylphenylpiperazine hydrobromide (prepared as described in Example I) (20 g.) was dissolved in water (100 ml.) and poured onto a mixture of crushed ice (100 g.) and an excess of ammonium hydroxide solution (d.=0.88; 25 ml.). The oily base which separated was extracted into chloroform (2× 50 ml.) and the combined chloroform extracts washed with water (50 ml.), dried over anhydrous magnesium sulphate and the solvent removed under reduced pressure. The residual m-trifluoromethylphenylpiperazine base was treated dropwise with acrylonitrile (4.7 ml.) followed by one drop of a 40% w./v. alcoholic benzyltrimethylammonium hydroxide solution. The reaction temperature rose slowly from 27° to 34° C. over 1 hour. The mixture was then allowed to cool and stand at ambient temperature for 60 hours. The oily mixture was heated at 50° C. for 2 hours, dissolved in isopropyl alcohol (100 ml.) and concentrated hydrochloric acid (d.=1.18; 5.53 ml.) added. A solid separated and after cooling this solid was collected by filtration. It was recrystallised from a mixture of isopropyl alcohol (250 ml.) and water (15 ml.) to give 1-(2-cyanoethyl)-4-(m-trifluoromethylphenyl)piperazine monohydrochloride (15.0 g.; 73%) as a white solid, M.P. 227–228° C.

The present invention further includes within its scope pharmaceutical compositions which comprise, as active ingredient, at least one compound of general Formula I, or non-toxic acid addition salt or, when Q is a carboxyalkyl group, salt thereof, in association with a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the compounds of Formula I is or are admixed with at least one inert diluent such as calcium carbonate, potato starch, alginic acid, or lactose. The compositions may also comprise, as is normal practice, additional substances other than inert diluents, e.g., lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention for oral administration also include capsules of absorbable material such as gelatin, containing one or more of the active substances with or without the addition of diluents or excipients.

Preparations according to the invention for parenteral administration include sterile aqueous or non-aqueous solutions, suspensions or emulsions. Examples of non-aqueous suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.025% by weight of active substance in the case of injectable solutions and at least 0.1% by weight of such substance in the case of oral preparations.

The following example illustrates pharmaceutical compositions according to the invention.

*Example IV*

Tablets of the formula:

|  | Mg. |
|---|---|
| 1-(2 - methoxycarbonylethyl)-4-(m-trifluoromethylphenyl)piperazine | 10 |
| Lactose | 49.5 |
| Starch | 20 |
| Dextrin | 20 |
| Magnesium stearate | 0.5 | are prepared by intimately mixing the piperazine derivative, lactose, starch and dextrin and passing the mixture through a 60-mesh British Standard sieve. After addition of the magnesium stearate, the mixture is granulated to a suitable size and the granules compressed to form tablets.

Instead of the piperazine derivative specified in the above formulation any other piperazine derivative within the scope of general Formula I may be employed, e.g., the compounds obtained as products in Examples II and III.

We claim:
1. A member of the class consisting of N-phenylpiperazine derivatives of the formula:

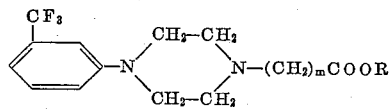

wherein *m* represents an integer from 0 through 6 and R represents alkyl of 1 through 6 carbon atoms, and non-toxic acid addition salts thereof.

2. An N-phenylpiperazine compound according to claim 1 wherein *m* represents 2 and R is a member of the class consisting of methyl and ethyl.

3. A member of the class consisting of 1-(2-methoxycarbonylethyl) - 4 - (m-trifluoromethylphenyl)piperazine and its non-toxic acid addition salts.

4. A member of the class consisting of 1-methoxycarbonyl-4-(m-trifluoromethylphenyl)piperazine and its non-toxic acid addition salts.

No references cited.

ALEX MAZEL, *Primary Examiner.*

HENRY R. JILES, *Assistant Examiner.*